United States Patent
Pickett

(10) Patent No.: US 9,916,505 B2
(45) Date of Patent: Mar. 13, 2018

(54) METHOD AND SYSTEM FOR COLLECTING IMAGE DATA

(71) Applicant: Deere & Company, Moline, IL (US)

(72) Inventor: Terence D. Pickett, Waukee, IA (US)

(73) Assignee: Deere & Company, Moline, IL (US)

( * ) Notice: Subject to any disclaimer, the term of this patent is extended or adjusted under 35 U.S.C. 154(b) by 76 days.

(21) Appl. No.: 14/492,478

(22) Filed: Sep. 22, 2014

(65) Prior Publication Data

US 2016/0086032 A1    Mar. 24, 2016

(51) Int. Cl.
  *G06K 9/00* (2006.01)
  *G06K 9/46* (2006.01)
  *G06T 1/00* (2006.01)
  *G06F 17/40* (2006.01)

(52) U.S. Cl.
  CPC ......... *G06K 9/00657* (2013.01); *G06F 17/40* (2013.01); *G06K 9/46* (2013.01); *G06T 1/0007* (2013.01); *G06T 2207/30188* (2013.01)

(58) Field of Classification Search
  CPC .... G06K 9/00657; G06K 9/46; G06T 1/0007; G06T 2207/30188; G06F 17/40
  See application file for complete search history.

(56) References Cited

U.S. PATENT DOCUMENTS

| | | | |
|---|---|---|---|
| 5,467,271 A | 11/1995 | Abel et al. | |
| 5,771,169 A * | 6/1998 | Wendte | A01B 79/005 702/5 |
| 5,790,428 A | 8/1998 | Easton et al. | |
| 5,927,603 A | 7/1999 | McNabb | |
| 6,052,187 A | 4/2000 | Krishnan et al. | |
| 6,466,321 B1 * | 10/2002 | Satake | G01N 21/3563 356/402 |
| 6,505,146 B1 * | 1/2003 | Blackmer | A01B 79/005 340/991 |
| 6,549,852 B2 * | 4/2003 | Hanson | A01B 79/005 702/2 |
| 7,908,661 B2 | 3/2011 | Silverbrook et al. | |

(Continued)

FOREIGN PATENT DOCUMENTS

| CA | 2663917 | 12/2014 |
|---|---|---|
| EP | 0960558 A1 | 1/1999 |

(Continued)

OTHER PUBLICATIONS

Search Report issued in counterpart application No. GB1516589.7, dated Feb. 25, 2016 (5 pages).

(Continued)

*Primary Examiner* — Katrina Fujita
(74) *Attorney, Agent, or Firm* — Yee & Associates, P.C.

(57) ABSTRACT

An evaluator can determine whether there is a material change in the observed parameter of a crop or field with respect to average measurements of the observed parameter. A location-determining receiver is adapted to determine a location of a vehicle corresponding to the material change in the observed parameter. An imaging device is adapted to collect the image data for a time interval associated with the material change. A data processor is arranged for associating the image data with the corresponding location data and storing the image data and corresponding location data in a data storage device.

22 Claims, 4 Drawing Sheets

(56) References Cited

U.S. PATENT DOCUMENTS

| | | |
|---|---|---|
| 9,076,105 B2* | 7/2015 | Anderson ............... G06N 5/04 |
| 2005/0015189 A1 | 1/2005 | Posselius et al. |
| 2005/0165552 A1* | 7/2005 | Fraisse .................. A01B 49/06 |
| | | 702/2 |
| 2008/0187181 A1 | 8/2008 | Meadow et al. |
| 2009/0198463 A1* | 8/2009 | Kamihara ........ G01N 35/00663 |
| | | 702/81 |
| 2011/0231061 A1 | 9/2011 | Reeve et al. |
| 2013/0116883 A1* | 5/2013 | Kormann ............ A01B 79/005 |
| | | 701/32.3 |
| 2014/0032479 A1 | 1/2014 | Lauenstein et al. |
| 2014/0132707 A1* | 5/2014 | Hashimoto ............. G01C 3/06 |
| | | 348/36 |

FOREIGN PATENT DOCUMENTS

| | | |
|---|---|---|
| EP | 2591654 A1 | 5/2013 |
| WO | 9919824 | 4/1999 |

OTHER PUBLICATIONS

Search Report issued in counterpart application No. DE102015216080.7, dated May 10, 2017 (5 pages).

* cited by examiner

METHOD AND SYSTEM FOR COLLECTING IMAGE DATA

FIELD OF THE INVENTION

This invention relates to a method and system for collecting image data for a field or work area.

BACKGROUND OF THE INVENTION

An operator of a vehicle may manually collect image data that indicates the status, condition, or appearance of a plant, crop, field or work area. However, the collection of image data may be inconsistent or lacking for certain areas or zones of the field or work area because of operator fatigue, distraction or other reasons. Accordingly, there is a need for an improved method and system for collecting image data for a field or work area to promote the collection of comprehensive or complete image data.

SUMMARY OF THE INVENTION

In accordance with one embodiment, the method and system measures an observed parameter of a crop or field. An evaluator can determine whether there is a material change in the observed parameter of a crop or field with respect to average measurements of the observed parameter. A location-determining receiver is adapted to determine a location of a vehicle corresponding to the material change in the observed parameter. An imaging device is adapted to collect the image data for a time interval associated with the material change. A data processor is arranged for associating the image data with the corresponding location data and storing the image data and corresponding location data in a data storage device.

DESCRIPTION OF THE PREFERRED EMBODIMENT

Figure 1:
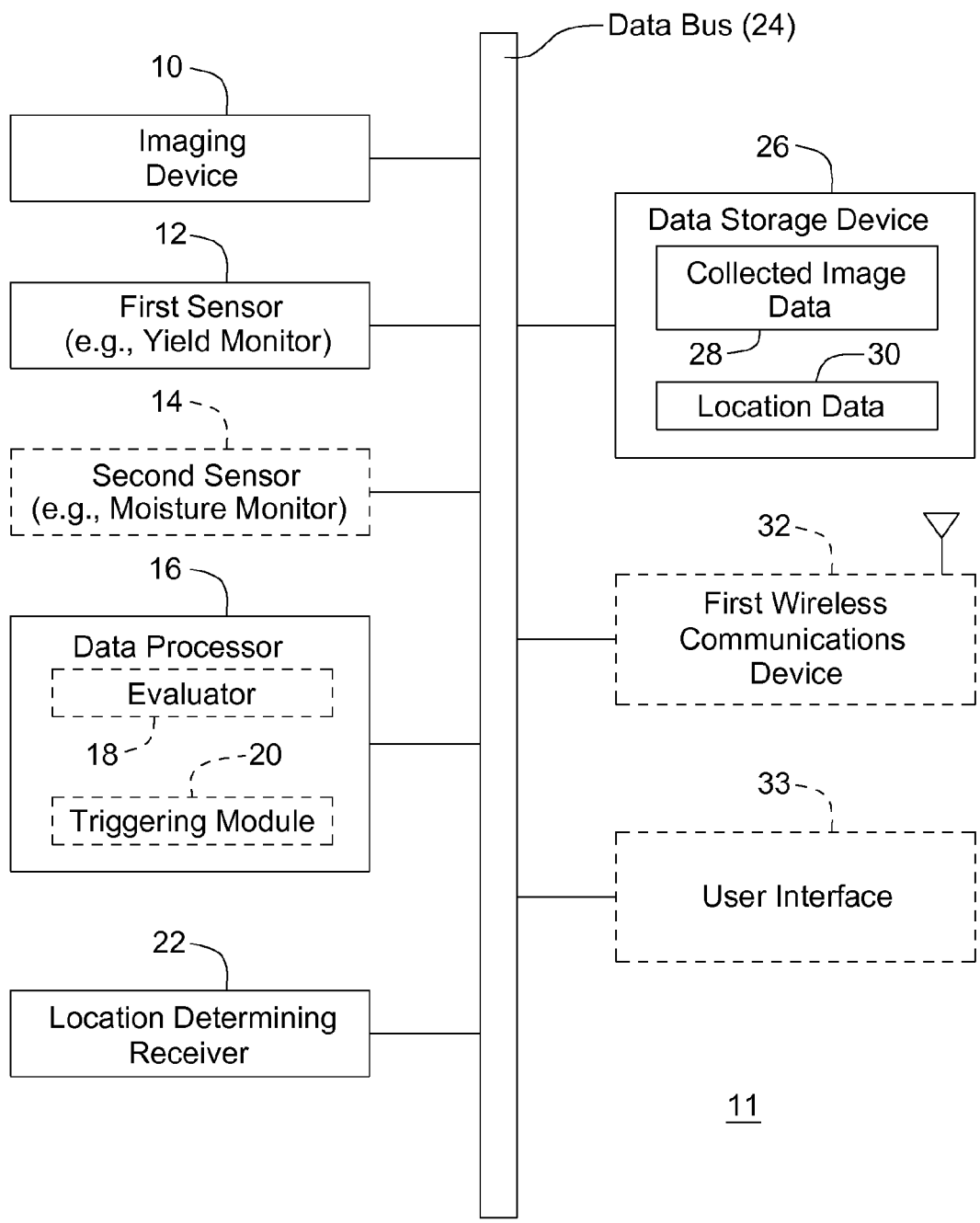
FIG. 1 is a block diagram of one embodiment of a system for collecting image data for a crop or field.

In accordance with one embodiment, FIG. 1 discloses system for collecting image data. The system for collecting image data comprises an imaging device 10, a first sensor 12, an optional second sensor 14, a data processor 16, a location-determining receiver 22, a data storage device 26, an optional user interface 33, and a first wireless communications device 32 coupled to the data bus 24. The data bus 24 may comprise the vehicle data bus 24 (e.g., controller area network) data bus 24, or another data bus 24. The second sensor 14 and the user interface 33 are optional as indicated by the dashed lines.

In an alternate embodiment, the data storage device 26 and the data processor 16 are replaced by a data processing device. In the alternate embodiment, the data processing device comprises a data processor 16, a communications interface and a data storage device 26 coupled to a secondary data bus 24. The communications interface supports communications between the data bus 24 (e.g., primary data bus 24 or vehicle data bus 24) and the secondary data bus 24.

The imaging device 10 comprises a camera or a digital imaging device 10 for collecting one or more still images, video images or other images in one or more of the following wavelengths of light or electromagnetic radiation: the humanly visible light spectrum, infra-red spectrum, near-infrared spectrum, or in any other wavelengths of electromagnetic radiation that are useful for evaluating crop vigor, health, weed pants versus crop plants, or otherwise.

The first sensor 12 comprises a yield monitor or another sensor for measuring the yield of a crop during harvesting or an estimated yield from remote sensing by aircraft, unmanned aircraft, sprayers, monopole or tower mounted imaging devices 10, or otherwise. For example, in one embodiment, the first sensor 12 comprises a yield monitor of a combine or harvester. In one configuration, the yield monitor may comprise an impact plate sensor that changes in position based on the amount of harvested material striking the impact plate, which in turn changes the capacitance, resistance or electrical parameter of an electrical device (e.g., variable capacitor or piezoelectric member) coupled to the impact plate. In another configuration, the yield monitor comprises any optical, piezoelectric, or other device for measuring the volume or weight of stored harvested material during harvesting. In yet another configuration, the first sensor 12 may comprise a yield monitor for sensing or estimating crop yield, crop yield per unit land area.

In an alternate embodiment, the first sensor 12 may comprise one or more imaging devices 10 or cameras for estimating crop plant nitrogen content, crop plant health, or crop plant vigor, crop plant size, crop plant height, and crop plant width for crop plants in one or more regions, or segments (e.g., rows or columns, points, or geographic coordinates) of the field or in the aggregate by regularly collecting sample images for the entire field, where the imaging device 10 or devices may collect visible light spectrum (e.g., red light spectrum), near infrared light spectrum, or other optical measurements or ratios (e.g., Normalized Difference Vegetation Index (NDVI)).

A second sensor 14 may comprise a moisture sensor for measuring moisture content of a harvested material. The moisture sensor may measure the transmittance or reflectance of a microwave signal transmitted into or through a sample of harvested material, for example.

In an alternate embodiment, the second sensor 14 may comprise one or more imaging devices 10 or cameras for estimating crop plant nitrogen content, crop plant health, or crop plant vigor, crop plant size, crop plant height, and crop plant width for crop plants in one or more regions, or segments (e.g., rows or columns, points, or geographic coordinates) of the field or in the aggregate by regularly collecting sample images for the entire field, where the imaging device 10 or devices may collect visible light spectrum (e.g., red light spectrum), near infrared light spectrum, or other optical measurements or ratios (e.g., Normalized Difference Vegetation Index (NDVI)).

A data processor 16 may comprise a microcontroller, a microprocessor, an application specific integrated circuit (ASIC), a programmable logic device, an integrated circuit, a logic circuit, an arithmetic logic unit, or another electronic data processing device or processing, inputting, outputting or manipulating data. The data processor 16 may comprise an evaluator 18, a triggering module 20, or both. The evaluator 18 and the triggering module 20 may be implemented by software, libraries or data that is stored in electronic memory of the data processor 16 or in the data storage device 26, for instance.

A location-determining receiver 22 may comprise one or more of the following receivers: a satellite navigation receiver; a global navigation satellite system receiver (GNSS), such as a GLONASS receiver or Galileo receiver; a satellite navigation receiver with differential correction; a Global positioning system (GPS) receiver; a Global positioning system (GPS) receiver with differential correction; or a terrestrial location-determining receiver for use with terrestrial transmitting beacons (e.g., using light signals, microwave signals, or other electromagnetic signals). For example, the differential correction may be provided by one or more reference stations and associated wireless communications devices (e.g., transceivers) or satellite communications devices.

The data storage device 26 may comprise electronic memory, nonvolatile electronic memory, a hard disc storage device, an optical disc storage device, a magnetic disc storage device, or another electronic, magnetic, or optical storage device for storing digital data, or its analog equivalent.

In one embodiment, the data storage device 26 stores collected image data 28 and location data 30.

The first wireless communications device 32 may comprise a wireless transceiver, a satellite transceiver, a satellite transponder, a cellular transceiver, a mobile radio, or another communications device for receiving and sending electromagnetic signals.

The optional user interface 33 may comprise one or more of the following a keypad, a keyboard, a pointing device, a display (e.g., liquid-crystal display), or a touch-screen display that allows a user to enter input data, control data, feedback and output image data, report, or an alert for review or tagging/recording with field notes by a user.

Figure 2:
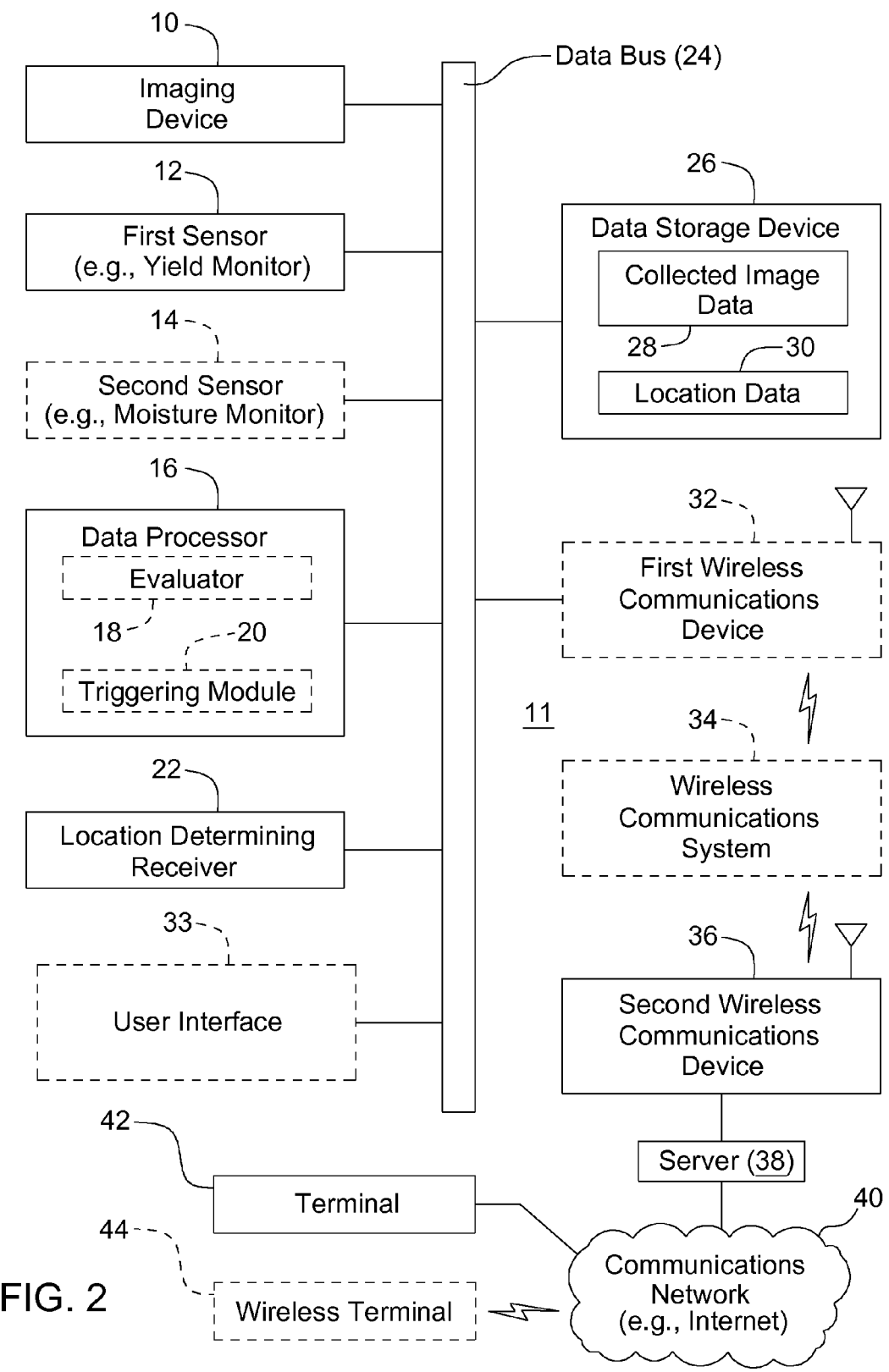
FIG. 2 is a block diagram of another embodiment of a system for collecting image data for a crop or field.

The system of FIG. 2 is similar to the system of FIG. 1, except the system of FIG. 2 further comprises a wireless communications system 34, a second wireless communications device 36, a server 38, a communications network 40 (e.g., Internet), a terminal 42 and an optional wireless terminal 44. Like reference numbers in FIGS. 1 and 2 indicate like elements.

The wireless communications system 34 comprises a cellular communications system, a repeater, a satellite communications system or another communications device for supporting communications between the first wireless device and the second wireless device.

The second wireless device is similar to or identical to the first wireless communications device 32. The second wireless communications device 36 may comprise a wireless transceiver, a satellite transceiver, a satellite transponder, a cellular transceiver, a mobile radio, or another communications device for receiving and sending electromagnetic signals.

The server 38 comprises a computer or data processing system coupled to the communications network 40, directly or indirectly (e.g., via an internet service provider). The communications network 40 may represent the Internet, a local area network, a wide area network, or another electronic communications network 40. A terminal 42 comprises a mobile electronics device, smartphone, desktop computer, or other device for accessing the communications network 40 and communicating with the server 38. A wireless terminal 44 comprises a wireless mobile electronics device, smartphone, or other wireless device for accessing the communications network 40 and communicating with the server 38 where the wireless terminal 44 may communicate with a wireless node, a wireless interface, or the wireless communications system 34 to the communications network 40.

Figure 3:
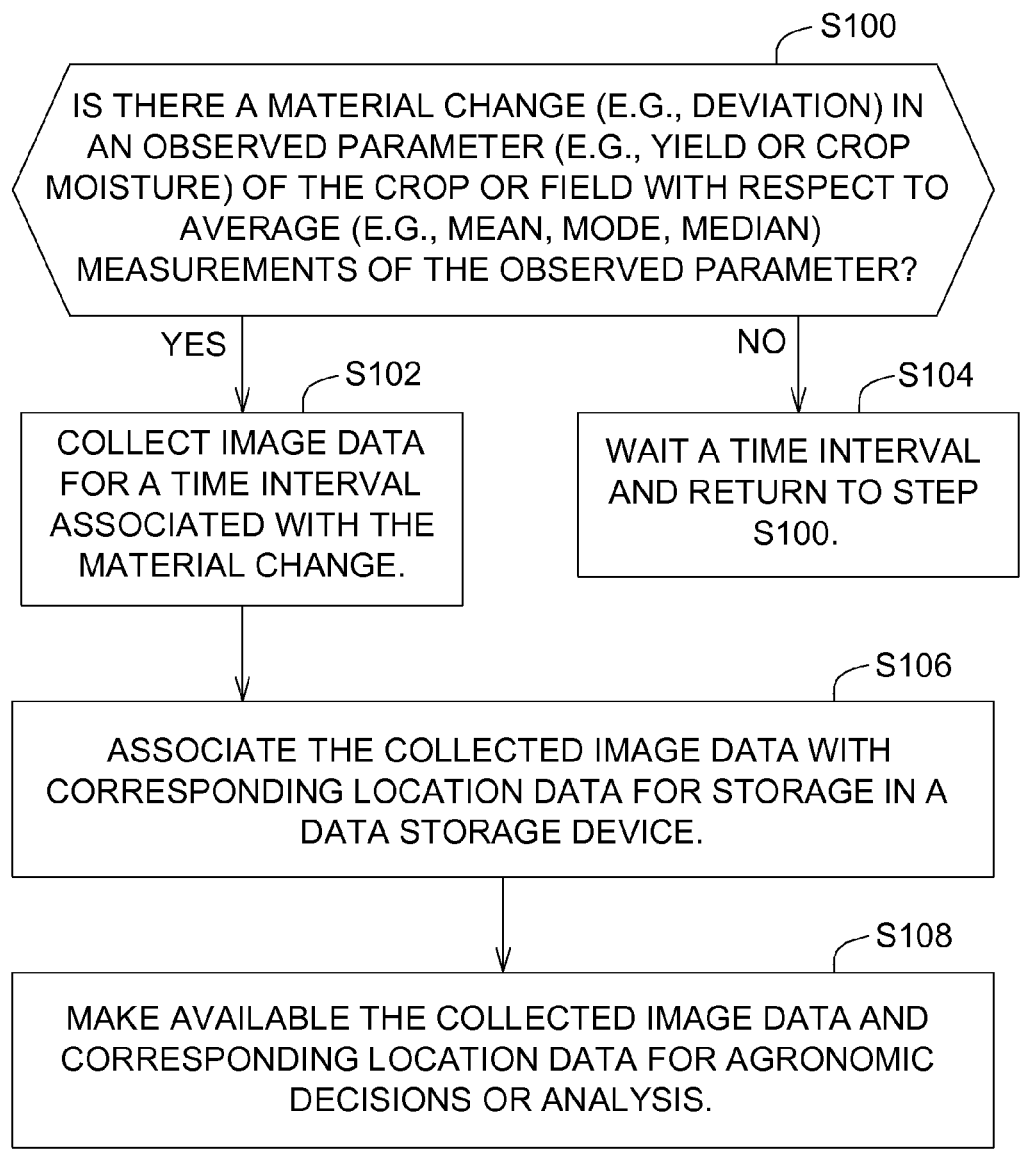
FIG. 3 is a flow chart of a first embodiment of a method for collecting image data.

FIG. 3 is a flow chart of a method for collecting image data for a field or work area. The system of FIG. 3 begins in step S100.

In step S100, the evaluator 18 or data processor 16 determines whether there is a material change (e.g., deviation) in an observed parameter (e.g., crop yield, crop yield per land area, or crop moisture) of the crop or field with respect to average (e.g., mean, mode, or median) measurements of the observed parameter. For example, a first sensor 12 (e.g., yield monitor) may provide yield data to the evaluator 18 or data processor 16 for determining the average (e.g., mean, mode, median) of the observed parameter and to determine a material change (e.g., local or zone material change) or deviation from the average of the observed parameter associated with a particular zone, portion or segment of the field or work site.

The observed parameter may comprise one or more of the following items: crop yield, crop yield per unit land area, crop moisture, crop moisture per crop unit volume, harvested crop mass, harvested crop volume, crop plant nitrogen content (e.g., as indicated by one or more sensors (12, 14) or imaging devices (10) that collect visible light spectrum, near infrared light spectrum, or other optical measurements or ratios, (e.g., NDVI)), crop plant height, plant width or plant size (e.g., as indicated by one or more sensors (12, 14), crop feelers or contact sensors, or imaging devices (10)), harvested crop constituents (e.g., protein, oil, or other attributes) of the crop, crop or grain loss (e.g., for a harvesting operation), seed spacing, seed depth, or planting acceleration levels. The average of the observed parameter may represent a mean, mode, or median of the observed parameter for the field or the work area for a time period (such as a current growing season or a past growing season), where the field encompasses a greater geographic area than one or more zones of the field or work area.

A material change means one or more of the following: (1) an observed parameter (e.g., zone crop yield per unit land area) for a local field area or zone is less than or equal to a threshold fraction or threshold percentage (e.g., ten percent) of the average observed parameter (e.g., average crop yield per unit land area) for a field, work site, a group of fields (e.g., a farm under common management or common management practices); (2) an observed parameter (e.g., zone crop yield per unit land area) for a local field area or zone is less than or equal to a threshold fraction or threshold percentage of the average observed parameter (e.g., average crop yield per unit land area) for a group of fields in a county, canton or other geographic region; or (3) an observed parameter (e.g., zone crop yield per unit land area) for a local field or zone is one standard deviation or more below an aggregate observed parameter or field average of the observed parameter throughout the field or work area, or a group of fields in the county, canton or geographical region for which historical yield data is available, or (4) the substantial absence of crop in local field area or zone, which can be defined as a crop yield for the local field area or zone that approaches zero or that is equal to or more than two standard deviations below an average yield for the field or group of fields.

In step S100, if the evaluator 18 or data processor 16 determines that there is a material change (e.g., deviation) in an observed parameter (e.g., crop yield, crop yield per land area, or crop moisture) of the crop or field with respect to average (e.g., mean, mode or median) measurements of the observed parameter, then the method continues with step S102. However, if the evaluator 18 or data processor 16 determines that there is not a material change (e.g., deviation) in an observed parameter (e.g., crop yield, crop yield per land area, or crop moisture) of the crop or field with respect to average (e.g., mean, mode, median) measurements of the observed parameter, then the method continues with step S104.

In step S102, the data processor 16 or the triggering module 20 collects image data for a time interval associated with the material change in an observed average (of an observed parameter) with respect to a reference average (for the parameter) for a current growing season or a past growing season, for example. In one embodiment, the time interval of step S102 is selected to capture image data or one or more images that are associated with the material change, or a zone (e.g., deviation zone), local region, segment, portion, row, or point (e.g., geographic coordinates) of a field or work area associated with the material change. Respective location data describes the zone, deviation zone, local region, segment, portion, row, column, point or geographic coordinates of the image data associated with a corresponding material change.

Step S102 may be carried out in accordance with various techniques that may be applied alternately or cumulatively. Under a first technique, the data processor 16 or triggering module 20 determines the time interval to maximize capturing of image data for a uniquely and discretely identifiable local geographic area of a corresponding zone (e.g., deviation zone), local region, segment, portion, row, or point (e.g., geographic coordinates) of a field or work area associated with the material change.

Under a second technique, the data processor 16 or triggering module 20 determines the time interval to maximize capturing of image data for one or more representative samples of an entire local geographic area of a corresponding zone (e.g., deviation zone), local region, segment, portion, row, or point (e.g., geographic coordinates) of a field or work area associated with the material change.

Under a third technique, the data processor 16 or triggering module 20 may adjust the time interval based on one or more parameters, such as the operating speed of the vehicle, a minimum number of samples per material change or zone of material change, user feedback provided via a user interface 33 to the data processor 16, and/or historic evaluation of image data (e.g., over-inclusive versus under-inclusive) of the region, segment, point, or coordinates of the material change of the observed parameter.

Under a fourth technique, the data processor 16 or the triggering module 20 collects image data for a time interval associated with the material change and preset positions or preset zones in the field or work area based on historic zones of material change of the observed parameter from one or more prior growing seasons.

Under a fifth technique, the data processor 16 or the triggering module 20 collects image data for a time interval associated with the material change, where the material change is representative of one or more measurements of the observed parameter that are indicative of an absence of a crop or absence of meeting target crop yield in one or more corresponding zones. For example, the local absence of a crop in a particular zone may be caused by excessive moisture, water damage, wind damage, insect damage, weed pressure, planting errors, or other factors.

In step S104, the data processor 16 waits a time interval and returns to step S100 after expiration of the time interval. In one embodiment, the time interval of step S104 may be derived from the time interval of step S102, proportional to the time interval of step S102, or approximately equal to, shorter, or longer than the time interval of step S102.

In step S106, the data processor 16 associates the collected image data 28 with corresponding location data 30 for storage in a data storage device 26. The collected image data 28 may represent a number of samples that are registered with or indexed to corresponding geographic coordinates, locations, or zones of a field. Further, the collected image data 28 for a field or group of fields may be stored along with crop type, crop variety, seed provider, planting date (e.g., planting year), along with any other data that permits comparison of deviation zones of material change from year to year of a field or group of fields.

In step S108, the data processor 16 or wireless communications device (32) makes available the collected image data 28 and corresponding location data 30 for agronomic decisions and analysis. For example, a data processor 16 or first wireless communications device 32 wirelessly communicates the associated image data and corresponding location data to a server 38 coupled to a communications network 40, where the server 38 provides the associated image data and corresponding location data in response to requests to one or more terminals (42, 44) in communication on or with the communications network 40.

In step S108, the data processor 16 may organize the collected image data 28 and corresponding location data 30 for deviation zones into a report or an alert. The collected image data 28, corresponding location data 30, report, and alert may individually or collectively be referred to as collected agronomic data. Although the collected agronomic data from the data processing system on the vehicle could be provided to a farmer, vehicle operator, analyst, agronomist or other person for analysis via a portable storage medium (e.g., a magnetic disk, optical disk or nonvolatile electronic memory), instead the collected agronomic data can be provided wirelessly to make it available via communications network 40, such as the Internet.

The first wireless communications device 32 of the data processing system is capable of communicating the collected agronomic data to wireless communications system 34. A second wireless communications device 36 is capable of communicating the collected agronomic data from the wireless communications system 34 to a server 38. In turn, the server 38 is coupled to the communications network 40 and may store collected agronomic data from one or more fields, operations or growers, where the farmer, vehicle operator, analyst, agronomist or other person may access the collected agronomic data, as authorized by applicable account and permissions, via the terminal 42 and/or wireless terminal 44.

In an alternate embodiment, the second wireless communications device 36 may be deleted where the wireless communications system 34 is coupled to the server 38. At the terminal 42, the farmer, vehicle operator, analyst, agronomist or other person may access the collected agronomic data for visual inspection or further processing by or in conjunction with agricultural management software, agronomic management software, statistical tools, spreadsheet reports, or otherwise. The collected agronomic data (e.g., collected image data and corresponding location data) can be stored in a file, record, database or other data structure in the data storage device 26 or server 38 (coupled to the communications network 40), such that when the end user responsible for the agronomic management requests collected agronomic data, the collected agronomic data is readily accessible and presented to the end user via a terminal (42, 44), or otherwise. In one configuration, the terminal (42, 44) and server 38 allow the end user to view of a map of a field and to select a point on the field to retrieve respective collected agronomic data that is representative of the observed data on field conditions at that point or selected location at the time of the operation.

Figure 4:
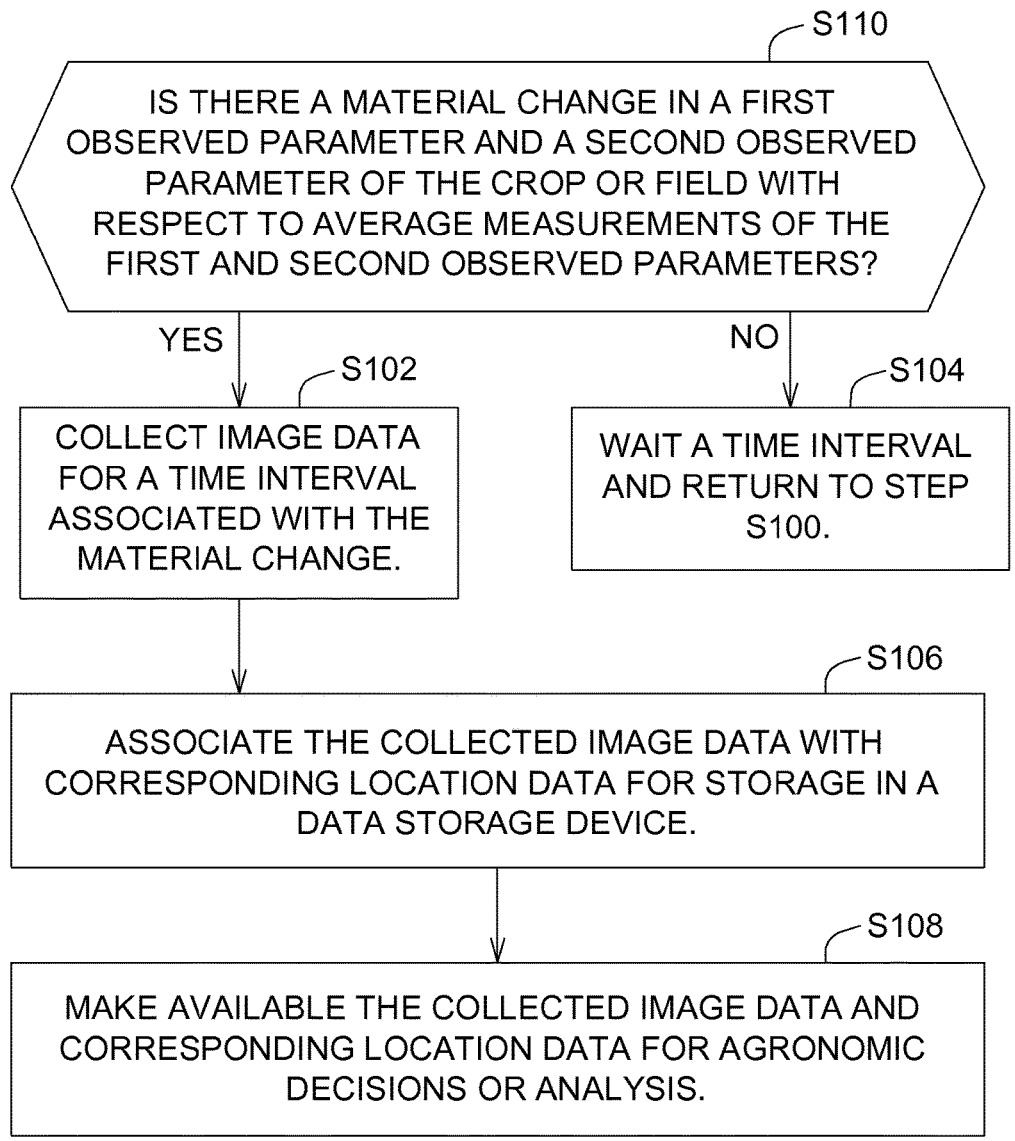
FIG. 4 is a flow chart of a second embodiment of a method for collecting image data.

FIG. 4 is a flow chart of a method for collecting image data for a field or work area. The method of FIG. 4 is similar to the method of FIG. 3, except the method of FIG. 4 replaces step S100 with step S110. Like reference numbers indicate like steps or procedures in FIG. 4.

In step S110, the evaluator 18 or data processor 16 determines whether there is a material change (e.g., deviation) in a first observed parameter (e.g., crop yield, crop yield per land area) and a second observed parameter (e.g., crop moisture) of the crop or field with respect to average (e.g., mean, mode, median) measurements of the first observed parameter and the second observed parameter. Step S110 may be carried out in accordance with various procedures that may be applied alternately or cumulatively. Under a first procedure, the observed parameter or observed parameters may comprise crop yield, crop moisture or both for one or more zones of a field or work area. Under a second procedure, the evaluator 18 or data processor 15 determines that a material change in an observed parameter comprises a first material change in a first observed parameter with respect to a first average measurement, a second material change in a second observed parameter of the crop or field with respect to a second average measurement, or both a first material change and a second material change. Under a third procedure, the data processor 16 or triggering module 20 commands or controls the imaging device 10 to collect the image data for a time interval associated with the material change, where imaging device 10 collects image data for a particular time interval associated with a simultaneous occurrence of the first material change and the second material change.

The method and system of this disclosure automatically triggers the collection of one or more geo-referenced digital images of a field from a vehicle operating in a field based on material parameter changes that can be useful or necessary for the agronomic management of the field. Such parameters may include (but not limited to) to yield, moisture, constituents (e.g., protein, oil, etc.), grain loss, seed spacing, depth or planting acceleration levels, nutrient application rates, fertilizer application rates, herbicide application rates, fungicide application rates, pesticide application rates, or chemical treatment application levels.

First, the method and system is well-suited for correlating field conditions to an observed change in parameters without requiring an operator of vehicle to stop or interrupt the operation (e.g., harvesting) or work task. Second, the method and system facilitates collection of collected agronomic data that are not otherwise visually noticeable or detectable by a human operator, or only noticeable in hindsight after a zone of interest is passed during operation of the vehicle. Third, the method and system supports collection of transient field conditions, as evidenced by image data that would otherwise be forgotten or destroyed incidental to an operation (e.g. harvesting). Fourth, the operator of the vehicle may suffer from fatigue or lack of interest or alignment with land owner, such that automated collection of data provides a reliable data source of the condition of problem areas within an entire field that can be managed or analyzed for treatment and yield improvement.

Having described the preferred embodiment, it will become apparent that various modifications can be made without departing from the scope of the invention as defined in the accompanying claims.

The following is claimed:

1. A method for collecting image data, the method comprising:
   determining whether there is a material change in an observed parameter of a crop or field with respect to average measurements of the observed parameter from a sensor of a vehicle in the field;
   determining a location of the vehicle and a deviation zone corresponding to the material change in the observed parameter, where the deviation zone represents a local region, segment, portion, row or point of the field;
   during operation of the vehicle in the field, automatically collecting the image data of the deviation zone for a time interval associated with the material change of the observed parameter of the crop or field, the image data collected from the vehicle in the field, where the time interval is adjusted based on the operating speed of the vehicle and a historic evaluation of inclusiveness of the image data of the deviation zone;
   associating the image data with the corresponding location data and storing the image data and corresponding location data in a data storage device.

2. The method according to claim 1 further comprising:
   making available the collected image data and corresponding location data for agronomic decision or analysis such any of the following: (a) estimating crop plant health for one or more plants in the deviation zone, (b) estimating crop plant nitrogen content for the one or more plants in the deviation zone, or (c) estimating crop plant size, crop plant width or crop plant height for the one or more plants in the deviation zone.

3. The method according to claim 1 wherein the making available comprises:
   wirelessly communicating the associated image data and corresponding location data to a server coupled to a communications network, where the server provides the associated image data and corresponding location data in response to requests to one or more terminals in communication on or with the communications network.

4. The method according to claim 1 wherein the observed parameter is selected from the group consisting of crop yield and crop moisture for one or more zones of a field or work area.

5. The method according to claim 1 wherein the average measurements comprise a mean, mode, or median of the observed parameter for the field or the work area, where the field encompasses a greater geographic area than one or more zones of the field or work area.

6. The method according to claim 1 wherein determining whether there is a material change in an observed parameter comprises determining whether there is a first material change in a first observed parameter with respect to a first average measurement and whether there is a second material change in a second observed parameter of the crop or field with respect to a second average measurement.

7. The method according to claim 6 wherein the collecting the image data for a time interval associated with the material change comprises collecting the image data for a particular time interval associated with a simultaneous occurrence of the first material change and the second material change.

8. The method according to claim 6 wherein the material change is representative of one or more measurements of the observed parameter that are indicative of an absence of a crop in one or more corresponding zones.

9. The method according to claim 1 wherein the determining comprises determining, by the sensor whether there is the material change in the observed parameter of the crop or field with respect to average measurements of the observed parameter for a current growing season or a past growing season.

10. The method according to claim 1 wherein the observed parameter for the deviation zone is approximately one standard deviation or more below an aggregate observed parameter or field average of the observed parameter throughout the field.

11. The method according to claim 1 wherein the where the automatically collecting of the image data provides a data source on a condition of one or more problem areas in the deviation zone within the entire field.

12. A method for collecting image data, the method comprising:
determining whether there is a first material change in a first observed parameter with respect to a first average measurement, the first observed parameter observed from a sensor of a vehicle in the field;
determining whether there is a second material change in a second observed parameter of the crop or field with respect to a second average measurement;
determining a location of the vehicle and a deviation zone corresponding to a simultaneous occurrence of the first material change in the first observed parameter and the second material change in the second observed parameter, where the deviation zone represents a local region, segment, portion, row or point of a field;
during operation of the vehicle in the field, automatically collecting the image data of the deviation zone for a particular time interval associated with the simultaneous occurrence of the first material change and the second material change of the observed parameters of the crop or field, the image data collected from the vehicle in the field, where the time interval is adjusted based on the operating speed of the vehicle and a historic evaluation of inclusiveness of the image data of the deviation zone; and
associating the image data with the corresponding location data and storing the image data and corresponding location data in a data storage device.

13. The method according to claim 12 further comprising:
making available the collected image data and corresponding location data for agronomic decision or analysis such any of the following: (a) estimating crop plant health for one or more plants in the deviation zone, (b) estimating crop plant nitrogen content for the one or more plants in the deviation zone, or (c) estimating crop plant size, crop plant width or crop plant height for the one or more plants in the deviation zone.

14. The method according to claim 12 wherein the making available comprises:
wirelessly communicating the associated image data and corresponding location data to a server coupled to a communications network, where the server provides the associated image data and corresponding location data in response to requests to one or more terminals in communication on or with the communications network.

15. The method according to claim 12 wherein the first observed parameter comprises crop yield for one or more zones of a field or work are and the second observed parameter comprises crop moisture for one or more zones of a field or work area.

16. The method according to claim 12 wherein the first average measurements comprise a mean, mode, or median of the first observed parameter for the field or the work area, where the field encompasses a greater geographic area than one or more zones of the field or work area.

17. The method according to claim 12 wherein the first average measurements comprise a mean, mode, or median of the second observed parameter for the field or the work area, where the field encompasses a greater geographic area than one or more zones of the field or work area.

18. A system for collecting image data, the system comprising:
a sensor for measuring an observed parameter of a crop or field, the sensor associated with a vehicle in the field;
an evaluator to determine whether there is a material change in the observed parameter of a crop or field with respect to average measurements of the observed parameter;
a location-determining receiver for determining a location of the vehicle and a deviation zone corresponding to the material change in the observed parameter, where the deviation zone represents a local region, segment, portion, row or point of a field;
an imaging device for automatically collecting the image data of the deviation zone for a time interval associated with the material change of the observed parameter of the crop or field, the image data collected from the vehicle in the field, where a triggering module establishes or triggers the time interval for collection of the image data by the imaging device and where the time interval is adjusted based on the operating speed of the vehicle and a historic evaluation of inclusiveness of the image data of the deviation zone; and
a data processor for associating the image data with the corresponding location data and storing the image data and corresponding location data in a data storage device.

19. The system according to claim 18 further comprising:
a server associated with a communications network;
a second wireless communications device coupled to the server;
a first wireless communications device in communication with the data storage device and the second wireless communications device, the first wireless communications device and the second communications device adapted to make available to the server the collected image data and corresponding location data for agronomic decision or analysis.

20. The system according to claim 19 further comprising:
one or more terminals in communication on or with the communications network; and
wherein the server is adapted to provide the associated image data and corresponding location data in response to requests to the one or more terminals.

21. The system according to claim 18 wherein the observed parameter is selected from the group consisting of crop yield and crop moisture for one or more zones of a field or work area.

22. The system according to claim 18 wherein the average measurements comprise a mean, mode, or median of the observed parameter for the field or the work area, where the field encompasses a greater geographic area than one or more zones of the field or work area.

* * * * *